3,469,961
METHOD AND APPARATUS FOR MAKING SLAG PELLETS
Thomas F. Barnhart, O'Hara Township, Allegheny County, and Roger L. Rueckl, Franklin Township, Westmoreland County, Pa., assignors to United States Steel Corporation, a corporation of Delaware
Filed Aug. 25, 1966, Ser. No. 574,977
Int. Cl. C04b 5/00; C03b 19/08, 19/10
U.S. Cl. 65—20                                10 Claims

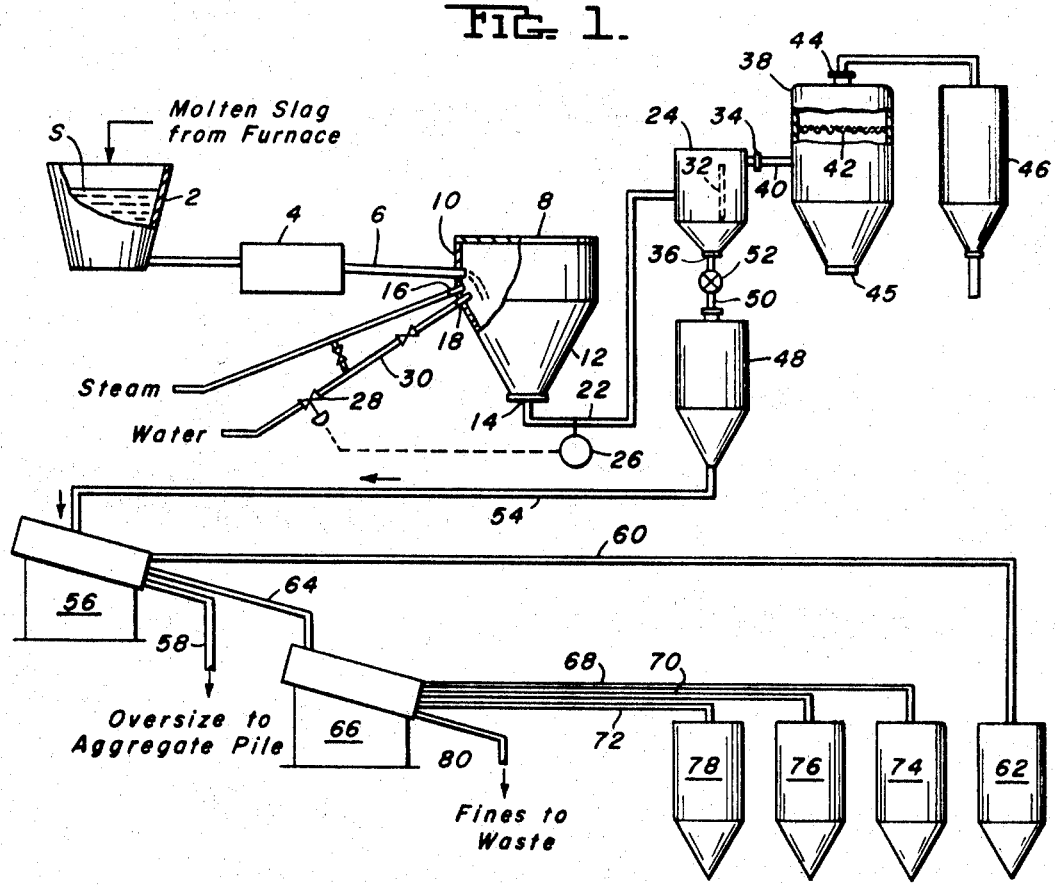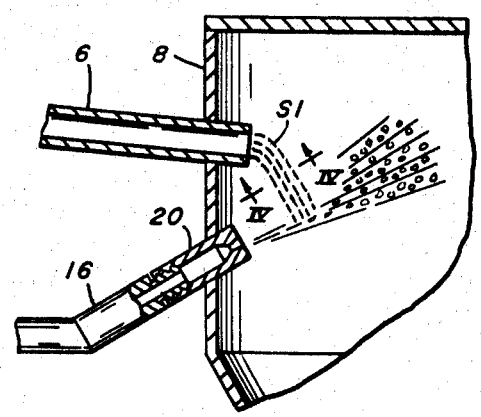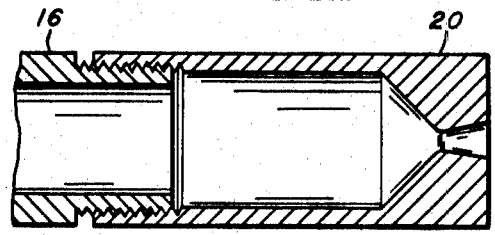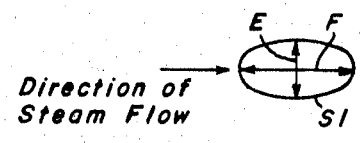
INVENTORS.
THOMAS F. BARNHART and
ROGER L. RUECKL
By Donald G. Dalton
Attorney United States Patent Office 3,469,961
Patented Sept. 30, 1969

ABSTRACT OF THE DISCLOSURE

A method of making dense spherical slag particles in which a high velocity gas jet is injected into a falling oblong stream of molten slag in the direction of the long dimension.

Apparatus for making either dense or porous slag pellets which includes a closed chamber having an upper portion of large horizontal cross section tapering to a small bottom opening, means providing a stream of molten slag in the top of the chamber, a jet of gas injected into the molten slag to break it into round pellets and fibrous particles, means for controlling the introduction of pellet cooling water into the stream to such an amount that the water is converted to steam and together with the gas forms a carrier for the pellets into a separator which separates the pellets from the fibrous particles.

BACKGROUND OF THE INVENTION

This invention relates to a method and apparatus for making slag pellets and more particularly for making slag pellets from molten blast furnace slag. It is quite common to make slag pellets having a porous structure as shown by Osbourne Patent No. 2,702,407 dated Feb. 22, 1955 and Seghers Patent No. 1,008,204 dated Nov. 7, 1911. It has also been known to produce slag pellets having a dense structure as shown by Bartholomew Patent No. 3,054,139 dated Sept. 18, 1962 and Schott Patent No. 3,245,866 dated Apr. 12, 1966. It is to the latter type of pellets that this invention is particularly directed. We have found it is difficult to control Bartholomew's method to obtain a product having a uniform quality. The method disclosed in the Schott patent is expensive since the temperature of the slag must be very high, a special type of slag must be used and a special quenching medium must be used. Dense slag pellets are useful as a proppant in hydraulically fractured oil and gas wells since they have a higher crushing strength, better shape and better control of size than the sand which is normally used for this purpose.

It is therefore an object of our invention to provide a method of producing dense slag pellets of spherical or near spherical shape and of controlled size.

Another object is to provide such a method which is relatively inexpensive.

Still another object is to provide apparatus suitable for producing slag pellets including simple means for handling and classifying the produced pellets.

These and other objects will be more apparent after referring to the following specification and attached drawings, in which:

FIGURE 1 is a schematic view of the apparatus;
FIGURE 2 is a sectional view of the gas jet nozzle;
FIGURE 3 is a partial sectional view of the blowing tank, particularly illustrating the slag runner and gas jet; and
FIGURE 4 is a view along line IV—IV of FIGURE 3 showing the cross section of the slag stream.

Referring more particularly to the drawings, reference numeral 2 indicates a ladle for holding molten slag S. The slag S is poured into a pouring box 4 and passes through slag runner 6 to a blowing tank or receiver 8 which is a closed chamber having an upper portion 10 of large horizontal cross section and a conical bottom 12 with an opening 14 at the bottom thereof. For example, portion 10 may be 30 ft. in diameter with the cone 12 tapering at 60° to an opening of 30 in. in diameter. A gas jet or jets 16 are arranged in the large diameter portion 10 and are preferably directed upwardly at an angle of approximately 30°. A water jet 18 is located adjacent each gas jet 16. The nozzle for the jet 16 is preferably a high velocity nozzle 20 as shown in FIGURE 2. Such jets can produce supersonic exit velocities. A conduit 22 has one end connected to opening 14 and the other end connected to a separator 24. A temperature sensitive control 26 having its sensing unit in the conduit 22 controls a valve 28 in conduit 30 leading to the water jet 18. The separator 24 has a baffle plate 32 opposite the discharge from the conduit 22, a top outlet 34 and a bottom outlet 36. The top outlet 34 is connected to a rock wool filter 38 by means of conduit 40. The filter 38 has a screen 42 therein above the inlet from conduit 40, a gas outlet 44 at the top and a bottom outlet 45. The outlet 44 is connected to a barometric condenser 46 or other means for creating flow from the tank 8 through the conduit 22, separator 24 and filter 38. The bottom outlet 36 of separator 24 is connected to a surge bin 48 through a conduit 50 having a valve 52 therein. The surge bin 48 is connected by means of a conduit 54 to a 2-deck screen 56. Oversize pellets from screen 56 are delivered through chute 58 to an aggregate pile. Pellets suitable for proppants are delivered through chute 60 to a bin 62. Smaller pellets from the screen 56, which are also suitable for proppants, are delivered through chute 64 to a 3-deck screen 66. Chutes 68, 70 and 72 deliver sized pellets to bins 74, 76 and 78, respectively. Fines are delivered through chute 80.

In producing dense spherical slag pellets a stream S1 of molten slag, as shown in FIGURE 3, falls downwardly in front of high pressure nozzle 20 at a distance of between 12 and 16 in. from the nozzle outlet. The slag runner 6 is so shaped that the stream S1 is oblong in cross section, as shown in FIGURE 4, with its long dimension F preferably being at least twice the distance of its short dimension E. By going contrary to the teachings of the prior art, which teaches injecting gas into the slag stream in the direction of its short dimension, we have found that we can produce a large proportion of solid pellets rather than the porous pellets of the prior art by injecting the gas into the stream in the direction of its long dimension. It is preferred that the slag be at a temperature of between 50 and 100° F. above its liquidus temperature which is between 2500 and 2550° F. for most blast furnace slag. However, we have found that the temperature of the slag may be lower than this.

In one particular practice using four jets 16, blast furnace slag is poured into the box 4 at a rate of 1200 lbs. per minute with each stream flowing at a rate of 300 lbs. per minute. Each nozzle is supplied with approximately 30 lbs. of steam per minute at a pressure of 25 lbs. The slag is blown across the tank 8 and is cooled by the water jet 18 which impinges on the slag at approximately the same position as the steam. The amount of water supplied is such that the pellets will be cooled to a temperature of 2200° or less before they hit the side of the tank opposite the steam jet and all of the water will be vaporized into steam. Normally the temperature in the conduit 22 is maintained at about 300° F. If the temperature rises above 300°, control 26 will cause valve 28 to open wider so that more water is delivered into the tank 8. If the temperature falls below 300° F. control 26 will cause the valve 28 to move toward a more closed position so as to reduce the amount of water introduced into the tank 8. If material were available for lining the tank so that it would not be damaged by the high slag temperature the water jets could be omitted and still produce suitable pellets. In order to produce a large percentage of solid pellets, a minimum of 5 lbs. of slag is processed by each pound of steam or other gas which may be used in place thereof. It is preferred that the steam pressure be at least 12 lbs. and that it be injected upwardly at an angle of approximately 30° into the slag. In addition to forming solid round pellets having a density substantially the same as that of the slag from which they are formed, some fibrous slag particles generally of less density are formed. All of the pellets and other particles formed in the tank 8 will be conveyed in the steam through conduit 22 by means of the vacuum created by the barometric condenser 46. The solid round pellets are separated from the fibrous slag particles in the separator 24 and will be delivered periodically into the surge bin 48. The lighter particles pass into the filter 38 where they are separated from the steam and removed periodically through the bottom opening 45.

The solid particles from the surge bin 48 are conveyed to the 2-deck screen 56. The oversize particles from the screen 56 pass to an aggregate pile. The larger size suitable for proppants will pass from the screen 56 to the tank 62 with the remainder passing to the 3-deck screen 66 where pellets of three sizes are screened and delivered to the tanks 74, 76 and 78. Particles too fine for pellets will pass through all screens to a pile for use as grit.

While our invention is particularly adapted for producing a large percentage of solid particles, the apparatus can be used for making light weight particles which may be used for concrete aggregate or other purposes. This can be done in various ways, some of which are well known. Since the equipment for this purpose is much different than that shown it is preferred to provide a second pouring box, slag runner, and jets so that little time is required to change from one type of operation to the other.

We claim:
1. The method of making dense spherical slag pellets which comprises providing a falling stream of molten slag having an oblong cross-section, and injecting a high velocity gas jet into said stream in substantially the direction of its long dimension.

2. The method of claim 1 in which there is a minimum of 5 lbs. of slag introduced for each pound of injected gas.

3. The method of claim 1 in which the stream of slag and gas jet are in a closed vessel, the gas jet is steam, and cooling water is impinged on the slag stream at approximately the same position as the steam.

4. The method of claim 3 in which there is a minimum of 5 lbs. of slag introduced for each pound of injected gas.

5. The method of claim 4 in which the slag is blast furnace slag at a temperature between 2500° and 2550° F.

6. Apparatus for making slag pellets comprising a closed chamber having an upper portion of large horizontal cross section tapering to a small opening at the bottom thereof, means providing a stream of molten slag in said chamber adjacent the top, means for introducing a jet of gas into said stream, said jet breaking said molten slag into substantially round pellets and fibrous particles, means for introducing water into said stream, means for controlling the water flow to an amount sufficient to cool pellets formed by said jet of gas and to form substantially all of said water into steam by contact with said slag, a conduit attached to the bottom opening of said chamber, a separator connected to said conduit for separating said pellets from said fibrous particles, and means for causing flow of said pellets and fibrous particles suspended in said gas and steam from said chamber to said separator.

7. Apparatus according to claim 6 in which the stream of molten slag is a falling stream, the water is introduced into said stream adjacent said jet of gas, and the pellets are dense.

8. Apparatus according to claim 7 in which said gas jet is directed upwardly into said slag stream at an angle of approximately 30°.

9. Apparatus according to claim 7 including a surge bin connected to said separator for receiving said dense pellets, a wool separator connected to said separator for receiving the fibrous particles, and wherein said means for causing flow of said pellets and fibrous particles is a barometric condenser connected to said wool separator.

10. The method of claim 5 in which the long dimension of the falling stream is at least twice as long as its short dimension.

References Cited
UNITED STATES PATENTS

| 2,885,077 | 5/1959 | Herron | 209—133 |
| 3,150,947 | 9/1964 | Bland | 65—21 |
| 3,279,905 | 10/1966 | Wood et al. | 65—141 |

S. LEON BASHORE, Primary Examiner

E. R. FREEDMAN, Assistant Examiner

U.S. Cl. X.R.

65—19, 21, 141, 142, 161, 162; 209—133; 264—12, 15